June 10, 1930.        A. N. WILCOX        1,763,413

WHEEL

Filed June 21, 1927

ALVA. N. WILCOX

Inventor

By Clarence S. Walker

His Attorney

Patented June 10, 1930

1,763,413

UNITED STATES PATENT OFFICE

ALVA N. WILCOX, OF DAYTON, OHIO

WHEEL

Application filed June 21, 1927. Serial No. 200,458.

This invention relates to an improvement in wheels and more particularly to vehicle wheels having tubular metal spokes and to the details of construction and formation of such spokes.

Wheels embodying this invention comprise generally a hub, a tire supporting means and a plurality of spokes connecting said hub to said means. The tire supporting means may be, as shown in the drawings, a felloe which receives a tire carrying rim, not shown, or the felloe may be omitted and the spokes be secured directly to the tire carrying rim. While the term felloe is used herein such use is for the purpose merely of ease in description and not of limitation.

One object of this invention is to provide a metal spoke wheel in which the load from the felloe is resisted longitudinally by the walls of the spokes, the spoke tenons serving solely as guiding and positioning means.

Another object of this invention is to provide means for connecting each spoke to the felloe which means include an annular seat formed in the inner face of the felloe and a shoulder on the spoke which rests in said seat.

Another object of this invention is to provide in each spoke at the nave or inner end a plurality of depressions which insure the proper location of the spokes at the hub.

A further object of this invention is to provide in a wheel having a hub a felloe in which are formed a plurality of circumferentially arranged, equally spaced holes and spokes, the tenons of which enter said holes, means for rigidly joining said spokes to said hub and for so connecting the spokes to the felloe that in case of any rupture or injury to the wheel the yield will be at the felloe allowing the spokes to separate therefrom.

Other objects will appear from an examination of the following description and of the accompanying drawings which form a part thereof and in which Fig. 1 is a front elevation of a portion of a wheel embodying this invention, certain parts being broken away;

Figure 1:
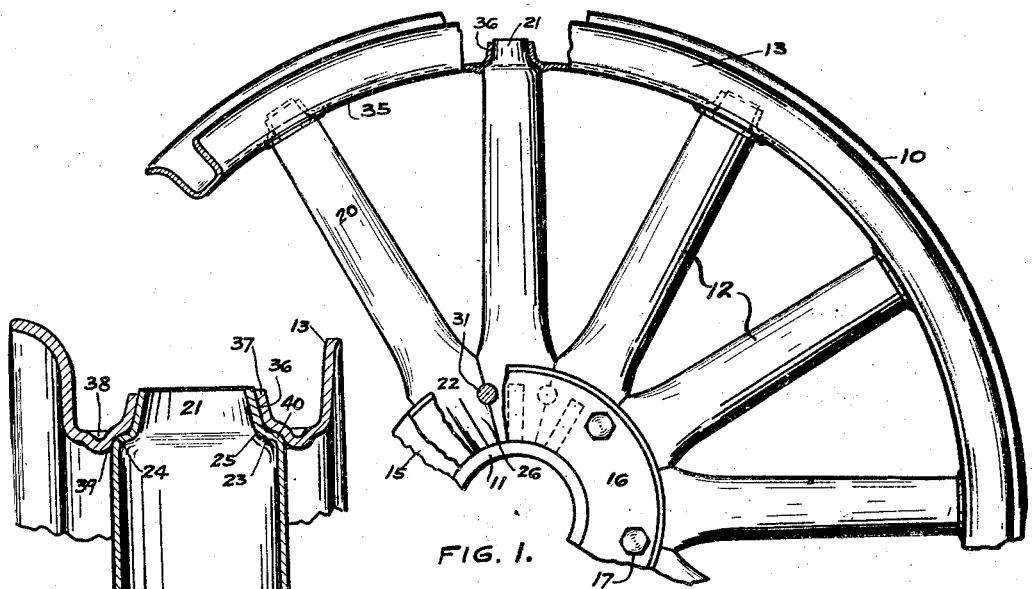
Figure 4:
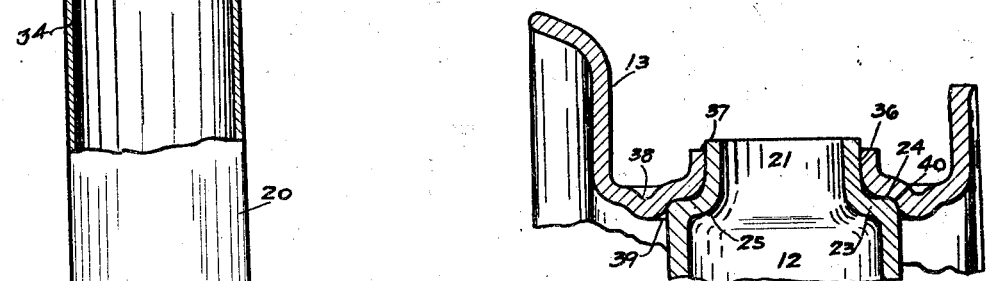
Fig. 4 is a cross sectional view of the spoke tenon and of the felloe the parts being in the assembled position before the spoke is clamped in place as shown in Fig. 2.

The wheel 10 herein illustrated and described comprises a hub 11, spokes 12 and a felloe 13 which supports a tire carrying rim not here shown, because it is common in the art and forms no part of the present invention.

The hub 11 in accordance with the usual practice may include a removable back flange or ring plate 15, and a front flange 16 usually integral with the hub. The flanges 15 and 16 are provided with a plurality of circumferentially arranged holes through which bolts 17 are passed for a purpose to be described later.

The spokes 12 preferably simulate wood spokes, having a tubular body portion 20, a tenon 21 and a closed nave or inner end 22. The tenon 21 is of less diameter than the body portion and is connected thereto by an integral ring 23 practically at right angles to the walls of the body portion 20 and providing a circular shoulder 24 at the outer end of the wall of the body portion. The ring 23 joins the tenon 21 at an annular edge 25.

The inner end 22 is continuous on the sides and resembles the conventional wedge shaped nave of a wood spoke having parallel flat front and back faces 26, 27 and converging flat side faces 28, 29. Semicylindrical recesses 30 are formed across each converging side face 26, 27 at a predetermined distance from the inner end so that when the spokes are assembled upon the hub the recesses 30 combine to form cylindrical passages 31. The spoke is preferably formed by bending in dies and consequently great difficulty is experienced in making the front face 26 and the side faces 28, 29 perfectly flat so that the parts may be assembled easily and have a full surface contact with each other. In order to obviate this difficulty a longitudinal depression 32 is formed in the front face 26 extending from the inner edge of the spoke and gradually decreasing in depth until it vanishes, and a transverse depression 33 is formed in each side face above the recess 30. These depressions 32, 33 take up the surplus metal which would otherwise cause bulging in the front and side faces and insure that these faces are flat. The spoke here shown is formed of one piece of sheet metal with the edges of the sheet interlocked along a seam 34 in the back and face 27 of the spoke. This interlocking seam ordinarily renders the provision of a depression on the back face unnecessary.

The felloe 13 is provided in the base 35 with a plurality of circumferentially arranged equally spaced holes 36 preferably bounded by outwardly extending annular flanges 37. In the base of the felloe surrounding each flange 37 is formed a circular depression 38 the reverse of the depression 38 providing on the inner face of the base a pocket 39 which encloses the inner end of the hole 36 and within which is an annular seat 40 around the hole.

Figures 2, 3, 5:
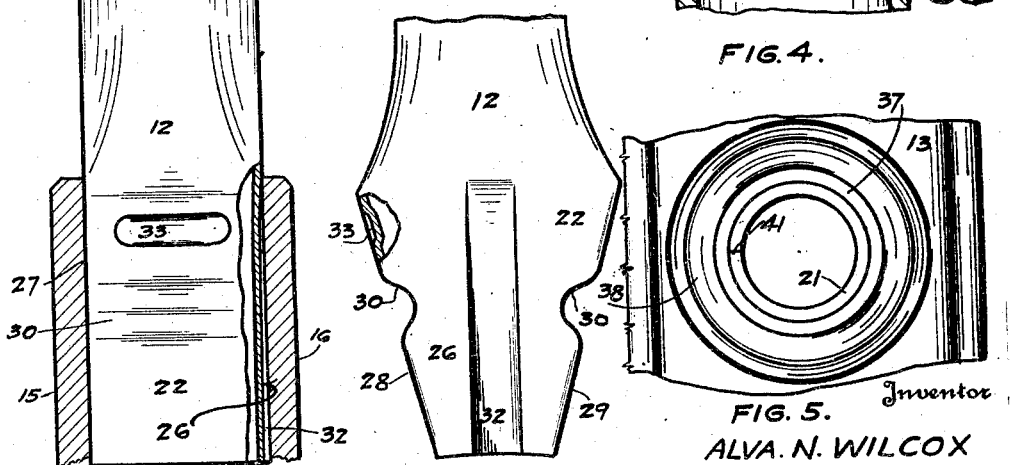
Fig. 2 is an enlarged side view of a spoke embodying this invention, showing in section the joinder of the spoke to the felloe.
Fig. 3 is an enlarged front elevation of the nave or inner end of the spoke.
Fig. 5 is a plan view of the felloe and spoke tenon illustrating the spoke clamped in place.

The parts thus described are assembled with the tenons 21 of the spokes 12 inserted into the flanged holes 36 of the felloe 13 and the converging flat sides of the naves 22 are brought together under pressure, until the front and back faces 26 and 27 of all the spokes in the wheel are in line. The shoulders 24 on the spokes enter the pockets 39 and bear upon the seats 40. The felloe and spokes are brought into closer contact to eliminate any vibration by clamping the flanges 37 upon the tenons 21. The flanges 37 are not only forced against the tenons 21 but the seats 40 are simultaneously forced against the shoulders 24. The edges of the spoke meet in the tenon 21 as shown at 41 in Fig. 5 so that the tenons may, if necessary, contract under the clamping pressure applied by the flanges 37.

The assembled spokes and rim commonly referred to as the spider, is now placed upon the hub 11 against the integral flange 16 and the removable back flange 15 or a brake drum clamped against its naves by means of the bolts 17 passed through the holes in the flanges and the passages 31.

It will be noted that the spokes 12 are rigidly secured to the hub 11 but are so connected to the felloe 13 that the load strain is resisted longitudinally by the walls of the body portion 20 and in case of any injury to the wheel the felloe may separate from the spokes but the spokes will resist any tendency of the felloe to collapse. This action is due to the fact that the felloe is supported directly upon the walls of the body portion 20 so that the load strain is resisted longitudinally by the walls, the tenons 21 acting solely to guide and position the felloe but not to resist the load strain.

Prior to this invention it has been the practice to roll or peen over the ends of the spokes upon the base or flange of the felloe which would prevent any movement of the felloe relative to the spoke and hence in case of injury the spokes would be pulled away from the hub which requires an entire rebuilding of the wheel. On the other hand with the spokes and felloe secured as described above the tenon can retreat from the felloe under unusual strain so that any injury which resulted in separating the felloe and spokes of a wheel embodying this invention can be quickly and easily repaired without rebuilding the entire wheel.

While one embodiment of this invention has been shown and described, applicant is not limited thereto, since it is obvious that other embodiments can be made without departing from the spirt and scope of this invention as set forth in the following claim.

Having thus set forth my invention what I claim as new and for which I desire protection by Letters Patent is:

In a metal spoked wheel, the combination with a felloe having a plurality of flanged holes adapted to receive the outer ends of the spokes, and pockets in the inner face of the felloe surrounding the holes, of tubular spokes the walls whereof are contracted to form tenons and integral rings, the joinders of said rings and the walls of the spoke bodies forming shoulders at the outer ends of the walls which enter and bear against the inner surfaces of the pockets and the joinders of the rings and tenons being spaced from the inner face of the felloe, whereby the load strain of the wheel is transmitted by the felloe directly to the walls of the spokes at the points of contact between pockets and shoulders formed at the outer ends of the walls and is resisted longitudinally by the walls.

In testimony whereof I have affixed my signature.

ALVA N. WILCOX.